United States Patent [19]

Kahara et al.

[11] Patent Number: 4,555,452
[45] Date of Patent: Nov. 26, 1985

[54] METHOD FOR OPERATING FUEL CELL

[75] Inventors: Toshiki Kahara, Ibaraki; Toshikatsu Mori, Hitachi; Jinichi Imahashi, Hitachi; Akio Honji, Hitachi; Kohki Tamura, Hitachi, all of Japan

[73] Assignee: Hitachi, Ltd., Tokyo, Japan

[21] Appl. No.: 709,132

[22] Filed: Mar. 7, 1985

[30] Foreign Application Priority Data

Mar. 9, 1984 [JP] Japan .................................. 59-43903

[51] Int. Cl.⁴ ............................................. H01M 8/04
[52] U.S. Cl. ......................................... 429/13; 429/23
[58] Field of Search ...................................... 429/13, 23

[56] References Cited

U.S. PATENT DOCUMENTS 4,202,933  5/1980  Reiser et al. .......................... 429/13
4,294,892  10/1981  Alfenaar ................................ 429/13

FOREIGN PATENT DOCUMENTS 55-19713 12/1980 Japan .

Primary Examiner—Donald L. Walton
Attorney, Agent, or Firm—Antonelli, Terry & Wands

[57] ABSTRACT

In operating a fuel cell comprising an oxidizing agent chamber subject to supply of an oxidizing agent gas and a fuel chamber subjected to supply of a fuel gas, sintering of noble metal particles such as platinum black as an electrode catalyst can be prevented from sintering by connecting the fuel cell to an outside auxiliary load circuit and controlling the unit cell voltage to not more than 0.80 V at start or discontinuation to operate the fuel cell or during the operation of the fuel cell when an outside load becomes too low due to fluctuation of the outside load. The fuel cell performance can be improved thereby.

9 Claims, 3 Drawing Figures

METHOD FOR OPERATING FUEL CELL

BACKGROUND OF THE INVENTION

This invention relates to a method for operating a fuel cell, and particularly to a method for operating a fuel cell which comprises controlling a unit cell voltage at the start or discontinuation to operate the fuel cell or when an outside load becomes too low due to fluctuation of the outside load during the operation, thereby suppressing sintering of noble metal particles such as platinum black, etc. used as an electrode catalyst and preventing deterioration of catalyst activity.

PRIOR ART

To start operation of a fuel cell, it has been the conventional practice to heat a fuel cell at about 190° to about 200° C. at first, then feed a fuel gas and an oxidizing agent gas to the fuel cell, thereby allowing an electrochemical reaction to proceed sufficiently in an open circuit state, and then connect the fuel cell to an outside load. To discontinue the operation of the fuel cell, the fuel cell is cut off from the outside load at first, thereby bringing the fuel cell into an open circuit state, then an inert gas is supplied to the fuel cell to remove the fuel gas and the oxidizing agent gas from the fuel cell.

According to these conventional procedures for starting and discontinuing operation of a fuel cell, the fuel cell is in an open circuit state at the start or discontinuation to operate the fuel cell, that is, in no load state, where a potential of at least 0.9 V, which approximates to the theoretical cell voltage, dominates. In such a state, the noble metal particles, such as platinum black, etc. used as the electrode catalyst, undergo sintering under such a high voltage, lowering the catalyst activity. This phenomenon is observable particularly at an electrode having a noble potential, that is, an air electrode.

To prevent phosphoric acid as an electrolyte in a fuel cell from dilution by water contained in air or fuel gas, or by the water formed by the electrochemical reaction when the operation of a fuel cell is discontinued, it has been proposed to close outlet valves for discharging the air and the fuel gas from the fuel cell, connect the fuel cell to an outside short circuit while supplying the air and the fuel gas to the fuel cell by natural diffusion, thereby consuming the oxygen in the air to fill the fuel cell with the resulting nitrogen-rich gas (Japanese Patent Application Kokai No. 55-19713). However, according to said operating procedure, the inlet valve for feeding air remains open, and thus the oxygen in the air is not completely consumed. In other words, the electrode potential still keeps noble owing to a very small amount of the remaining oxygen, causing sintering of catalyst platinum particles.

SUMMARY OF THE INVENTION

An object of the present invention is to provide a method for operating a fuel cell, which can prevent noble metal catalyst particles such as platinum black, etc. from sintering at the start or discontinuation to operate the fuel cell or when an outside load becomes too low due to fluctuation of the outside load during the operation, and can maintain a high catalytic activity for a prolonged time.

According to the present invention, a unit cell voltage is controlled to not more than 0.85 V by preventing the fuel cell from a complete open circuit state at the start or discontinuation to operate a fuel cell. More particularly, an outside auxiliary load circuit is provided at a fuel cell besides the outside load that consumes an electric power from the fuel cell, and when the outside load is off, the current is passed to the outside auxiliary load circuit from the fuel cell to prevent the fuel cell from application of a high potential that approximates to the theoretical cell voltage when the fuel cell is in an open circuit state. That is, to start the operation of the fuel cell, the fuel cell inside is purged with an inert gas, and then the fuel cell is connected to the outside auxiliary load circuit and heated. Then, the inert gas is replaced with a fuel gas and an oxidizing agent gas and the unit cell voltage is controlled to not more than 0.85 V. Then, the fuel cell is connected to the outside load and the outside auxiliary circuit is then cut off.

To discontinue the operation of the fuel cell, on the other hand, the fuel cell is connected to the outside auxiliary load circuit before the outside load is cut off, and then the fuel cell is cooled, while the outside load is cut off the fuel cell and the fuel gas and the oxiding agent gas are replaced with the inert gas. The unit cell voltage is controlled to not more than 0.85 V.

According to the present method for operating a fuel cell, the noble metal catalyst particles such as platinum black can be prevented from sintering by controlling the unit cell voltage of the fuel cell to not more than 0.85 V at the start or discontinuation to operate the fuel cell or when an outside load becomes too low due to fluctuation of the outside load during the operation, and the fuel cell performance can be thereby improved.

Changes in particle size of platinum black were investigated when potentials of 0.7, 0.8, 0.85, and 0.9 V [vs reversible hydrogen electrode (RHE)] were applied on an electrode having an electrode catalyst comprising platinum black supported on carbon particles, the electrode catalyst being coated on a porous carbon substrate, while using phosphoric acid as an electrolyte, heated at about 200° C., and applying the potentials for a duration of 100 hours. The results are shown in the following Table.

TABLE

| Applied potential (V vs RHE) | Platinum particle size (Å) |
|---|---|
| 0.7 | 68 |
| 0.8 | 78 |
| 0.85 | 100 |
| 0.9 | 150 |

Platinum particle size on the virgin electrode which was not subjected to potential application was 65 Å.

As is apparent from the foregoing Table, sintering is more liable to take place on the platinum black with increasing potential, and the particle sizes become larger. Though the sintering mechanism has not been completely clarified yet, it seems that the platinum black undergoes resolving into electrolyte under a higher potential and the platinum ion selectively redeposits on other platinum black supported on the carrier. It is seen from the foregoing results that in a fuel cell using platinum black as a catalytic component the platinum particles size can be prevented from growing and can maintain their initial surface area by controlling a unit cell voltage to not more than 0.85 V, particularly, not more than 0.8 V, and the fuel cell performance can be thereby prevented from lowering.

The auxiliary load in the outside auxiliary load circuit is selected in view of the outside load so that the unit cell voltage may be controlled to not more than 0.85 V, particularly to not more than 0.8 V.

The present invention will be described in detail below, referring to embodiments and drawings.

PREFERRED EMBODIMENTS OF THE INVENTION

Figure 1:
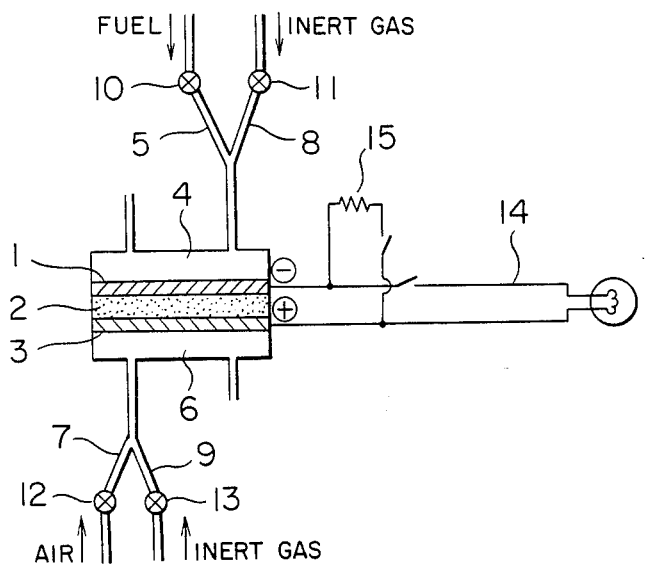
FIG. 1 and 2 schematically show apparatuses for carrying out the present method for operating a fuel cell.
Figure 2:
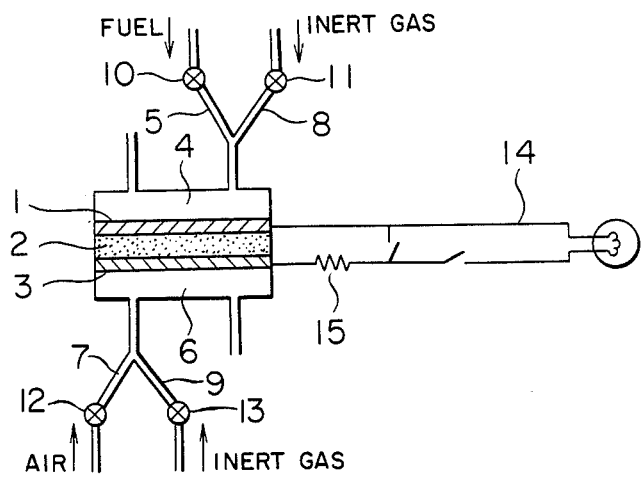

In FIGS. 1 and 2, an electrolyte 2 is provided between a fuel electrode 1 and an air electrode 3, and a fuel gas is supplied to a fuel chamber 4 through a line 5, whereas an oxidizing agent gas (air) is supplied to an oxidizing agent chamber 6 through a line 7. Lines 8 and 9 are lines for supplying an inert gas, respectively. Numerals 10 to 13 are switch valves.

In FIG. 1, an outside auxiliary load circuit 15 is provided in parallel to an outside load circuit 14, whereas in FIG. 2, an outside auxiliary load circuit 15 is provided in series to an outside load circuit 14.

A fuel cell shown in FIGS. 1 and 2 is a phosphoric acid type fuel cell having a power generation of 1.2 kW (12 V, 100 A), using hydrogen as a fuel gas and air as an oxidizing agent gas. To start operation of the fuel cell, an outside auxiliary circuit is connected to the fuel cell at first, and then the fuel cell is heated to about 200° C. while purging an air supply system and a hydrogen supply system of the fuel cell with a nitrogen gas. Then, hydrogen gas and air are supplied to the fuel cell, and the outside load circuit 14 is connected to the fuel cell. Then, the outside auxiliary load circuit 15 is cut off to conduct the required power generation. To discontinue the operation of the fuel cell, the outside auxiliary load circuit 15 is connected to the fuel cell before cutting off the outside load circuit 14, then the fuel cell is cooled while cutting off the outside load circuit 14, and the air and the hydrogen in the air supply system and the hydrogen supply system are replaced and purged with the nitrogen gas to stop the power generation.

Tests were conducted with said fuel cell according to said procedure using a variable outside load circuit, which was adjustable to meet maximum 20% of the fuel cell power generation, by varying the resistance of the outside auxiliary load to produce unit cell voltages of 0.8 V, 0.85 V, and 0.9 V, respectively. That is, the unit cell voltage of the fuel cell was kept at 0.8, 0.85 or 0.9 V for 10 minutes only in the outside auxiliary load circuit and then the fuel cell was operated in an outside load circuit of 1 kW for 50 hours while cutting off the outside auxiliary load circuit, and then the unit cell voltage of the fuel cell was again kept at 0.8, 0.85, or 0.9 V only in the outside auxiliary load circuit while cutting off the outside load circuit. These starting and discontinuing operations were repeated 20 times, and then the fuel cell was dismantled to determine the platinum particle size on the air electrode by a transmission-type electron microscope. It was found that the platinum particle size, as controlled to 0.8 V was 68 Å in contrast to the initial platinum black particle size of about 65 Å, and was not substantially changed, whereas that as controlled to 0.85 V was 105 Å, and that as controlled to 0.9 V was 170 Å.

Figure 3:
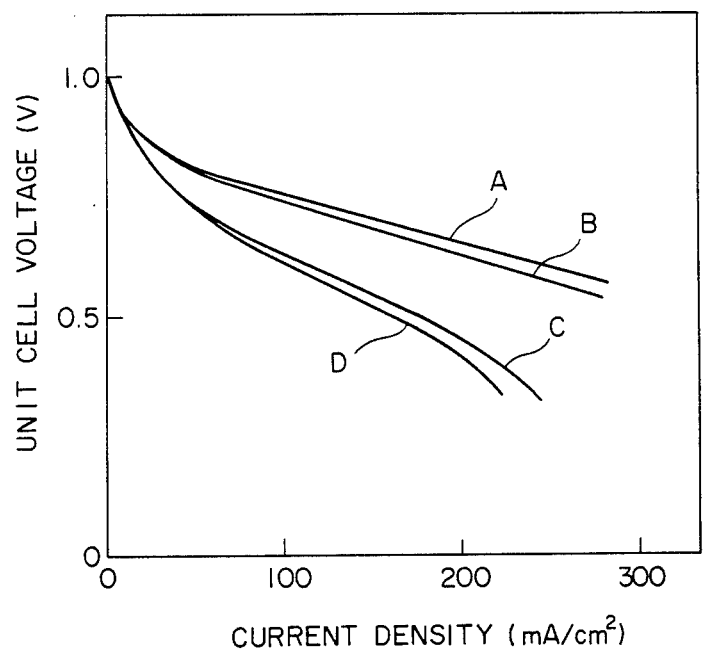
FIG. 3 is a diagram showing relationship between unit cell voltage and current density of fuel cell.

Results of cell performance are shown in FIG. 3, where the performance as controlled to 0.8 V is shown by curve A, and is substantially approximate to the performance of a fuel cell using a virgin electrode which was not subjected to the potential application; the performance shown by curve B relates to that as controlled to 0.85 V, which is by about 10% lower than that of curve A; and the performance shown by curve C relates to that as controlled to 0.9 V, which is by about 30% lower than that of curve A. For comparison, the performance of the fuel cell, which was started to operate in an open circuit state for 10 minutes, then operated in an outside load circuit of 1 kW for 50 hours, and discontinued again in an open circuit state, and subjected to 20 repetitions of the foregoing starting and discontinuing operation, is shown by curve D, where the platinum particle size grew into about 200 Å and the cell performance was by about 35% lower than that of curve A.

It is seen from the foregoing results that the unit cell voltage should not be made higher at both start and discontinuation to operate a fuel cell, and effectively should be kept at not more than 0.85 V, particularly at not more than 0.8 V.

In the actual fuel cell operation, the unit cell voltage can be readily kept below said desired voltage in the present invention by connecting a fuel cell to an outside auxiliary load at the start or discontinuation to operate the fuel cell where the unit cell voltage will take an open circuit voltage, thereby controlling the unit cell voltage not to take the open circuit voltage. The controlling can be also completely conducted by filling the oxidizing agent chamber and the fuel chamber with the inert gas, particularly, at the discontinuation to operate the fuel cell.

Whenever the outside load becomes too low due to fluctuation of the outside load during the operation of a fuel cell, besides said start or discontinuation of the operation, the fuel cell can be connected to the outside auxiliary load circuit to suppress an increase in the unit cell voltage, that is, control the unit cell voltage to not more than 0.85 V, preferably not more than 0.80 V. Since the unit cell voltage can be controlled at the start or discontinuation to operate the fuel cell or during the operation of the fuel cell, the decrease in fuel cell performance due to the sintering of noble metal particles, such as platinum black, etc. as an electrode catalyst can be prevented.

What is claimed is:

1. A method for operating a fuel cell comprising an oxidizing agent chamber subject to supply of an oxidizing agent gas and a fuel chamber subject to supply of a fuel gas, which comprises, at start to operate the fuel cell, purging the oxidizing agent chamber and the fuel chamber with an inert gas, while connecting the fuel cell to an outside auxiliary load circuit, then heating the fuel cell, then replacing the inert gas in the oxidizing agent chamber and the fuel chamber with an oxidizing agent gas and a fuel gas, respectively, and feeding the gases thereto, thereby controlling a unit cell voltage to not more than 0.85 V, and then connecting the fuel cell to an outside load circuit, thereby starting the operation of the fuel cell.

2. A method according to claim 1, where the oxidizing agent gas is air, and the fuel gas is hydrogen or a hydrogenrich gas.

3. A method according to claim 1, wherein the unit cell voltage is controlled to not more than 0.80 V before connecting the fuel cell to the outside load circuit, thereby starting the operation of the fuel cell.

4. A method for operating a fuel cell comprising oxidizing agent chamber subject to supply of an oxidizing agent gas and a fuel chamber subject to supply of a fuel gas, which comprises, at start to operate the fuel cell, purging the oxidizing agent chamber and the fuel chamber with an inert gas, while connecting the fuel cell to an outside auxiliary load circuit, then heating the fuel cell, then replacing the inert gas in the oxidizing agent chamber and the fuel chamber with an oxidizing agent gas and a fuel gas, respectively, and feeding the gases thereto, thereby controlling a unit cell voltage to not more than 0.85 V, and then connecting the fuel cell to an outside load circuit, and cutting off the outside auxiliary load circuit, thereby starting the operation of the fuel cell; at discontinuation to operate the fuel cell, connecting the fuel cell to the outside auxiliary load circuit before cutting off the outside load circuit, cooling the fuel cell, while cutting off the outside load circuit, replacing the oxidizing agent gas in the oxidizing agent chamber and the fuel gas in the fuel chamber with an inert gas, controlling the unit cell voltage of the fuel cell to not more than 0.85 V, and then cutting off the outside auxiliary load circuit, thereby discontinuing the operation of the fuel cell.

5. A method according to claim 4, where the oxidizing agent gas is air, and the fuel gas is hydrogen or a hydrogen-rich gas.

6. A method according to claim 4, wherein the unit cell voltage is controlled to not more than 0.80 V at the start and discontinuation to operate the fuel cell.

7. A method for operating a fuel cell comprising an oxidizing agent chamber subject to supply of an oxidizing agent gas and a fuel chamber subject to supply of a fuel gas, which comprises, at start to operate the fuel cell, purging the oxidizing agent chamber and the fuel chamber with an inert gas, while connecting the fuel cell to an outside auxiliary load circuit, then heating the fuel cell, then replacing the inert gas in the oxidizing agent chamber and the fuel chamber with an oxidizing agent gas and a fuel gas, respectively, and feeding the gases thereto, thereby controlling a unit cell voltage to not more than 0.85 V, and then connecting the fuel cell to an outside load circuit, and cutting off the outside auxiliary load circuit, thereby starting the operation of the fuel cell; during the operation when an outside load becomes too low in the outside load circuit due to fluctuation of the outside load, connecting the fuel cell to the outside auxiliary load circuit, and controlling the unit cell voltage to not more than 0.85 V; and at discontinuation to operate the fuel cell, connecting the fuel cell to the outside auxiliary load circuit before cutting off the outside load circuit, cooling the fuel cell, while cutting off the outside load circuuit, replacing the oxidizing agent gas in the oxidizing agent chamber and the fuel gas in the fuel chamber with an inert gas, controlling the unit cell voltage of the fuel cell to not more than 0.85 V, and then cutting off the outside auxiliary load circuit, thereby discontinuing the operation of the fuel cell.

8. A method according to claim 7, where the oxidizing agent gas is air, and the fuel gas is hydrogen or a hydrogenrich gas.

9. A method according to claim 7, wherein the unit cell voltage is controlled to not more than 0.80 V at the start and discontinuation to operate the fuel cell, and during the operation, when the outside load becomes too low.

* * * * *